July 10, 1923.

C. B. MILLS

SADDLE

Filed July 15, 1922

1,461,282

Inventor.
Claude Brookins Mills

Patented July 10, 1923.

1,461,282

UNITED STATES PATENT OFFICE.

CLAUDE BROOKINS MILLS, OF HIGH RIVER, ALBERTA, CANADA.

SADDLE.

Application filed July 15, 1922. Serial No. 575,253.

*To all whom it may concern:*

Be it known that I, CLAUDE BROOKINS MILLS, a citizen of the United States, residing at the town of High River, in the Province of Alberta, Dominion of Canada, have invented new and useful Improvements in Saddles, of which the following is a specification.

My invention relates to improvements in saddles and the objects of my invention are, first, to provide means for so mounting the stirrup leathers on the saddle as to enable greater freedom of movement of the stirrup forward and backward, second, to provide means for strengthening the saddle tree and, third, to provide means for mounting the mounting means for the stirrup leathers which may be adjusted to fit any saddle tree.

I attain these objects by the device illustrated in the accompanying drawings, in which—

Figure 1:
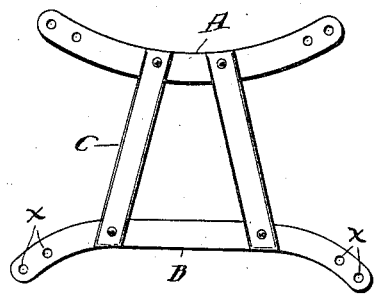
Figure 2:
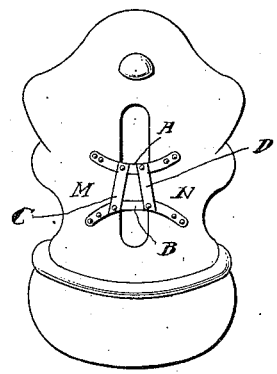
Figure 3:
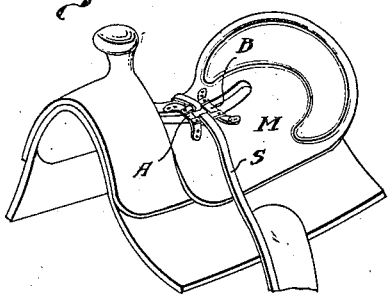

Figure 1 is a top view of the device; Figure 2 is a top view of a tree with the device attached and Figure 3 is a side view of a tree with the device attached and the stirrup leather in place.

Similar letters refer to similar parts throughout the several views.

The device consists of 4 bars of soft steel as shown in Figure 1.

In Figure 1, the bars marked "A" and "B" are curved to fit the saddle tree and can be proportioned to each individual tree.

Each of the bars marked "C" and "D" is provided with an offset which leaves a clearance for a stirrup leather of the standard width to be inserted.

The inner edges of the bars "C" and "D" are rounded to prevent the metal from cutting the stirrup leathers.

The bars "C" and "D" are welded and riveted to the bar marked "A" at one-quarter of an inch on each side from the center of the bar "A" and one-half of an inch apart and the bars "C" and "D" are welded and riveted to the bar "B" at one inch on each side from the center of the bar "B" and two inches apart.

The device is placed on the seat of a tree as far forward as possible and with the bar marked "A" towards the front of the saddle tree as shown in Figure 2 and is attached to the saddle tree at eight points by means of screws through the holes marked "X" in the bars "A" and "B."

The bars "A" and "B" are attached to both sides of the saddle tree marked "M" and "N" and so give it additional strength and are made of soft steel and adjustable to the tree.

The bars "C" and "D" are set at an angle and converge towards the front of the saddle tree and so allow the stirrup leathers to be swung farther forward.

Figure 3 shows a side view of the saddle tree with the device in place and with the stirrup leather marked "S" inserted over the bar "C" and drawn down on the same side of the saddle tree and on top of the saddle tree. A stirrup leather fits in a similar manner over the bar "D" on the other side of the saddle tree.

I am aware that prior to my invention the stirrup leathers were hung over each side of the saddle tree marked "M" and "N" which in no way strengthened the saddle tree and which prevented the stirrups from being moved forward and backward as far as necessary.

I therefore do not claim such a combination broadly; but

I claim:

The combination with a saddle having a tree of a stirrup leather frame comprising transverse bars adjustably mounted on the tree, and longitudinal bars converging toward their forward ends rigidly mounted on said transverse bars, substantially as described.

CLAUDE BROOKINS MILLS.